United States Patent [19]
Woycik et al.

[11] Patent Number: 5,560,650
[45] Date of Patent: Oct. 1, 1996

[54] INTERMEDIATE STEERING SHAFT

[75] Inventors: Richard E. Woycik, Saginaw; Terry E. Burkhard, Bay City; Dale E. Confer, Bridgeport, all of Mich.

[73] Assignee: General Motors Corporation, Detroit, Mich.

[21] Appl. No.: 506,311

[22] Filed: Jul. 24, 1995

[51] Int. Cl.$^6$ ................................................ B62D 1/19
[52] U.S. Cl. .......................... 280/777; 74/492; 464/162; 403/2; 403/265
[58] Field of Search .................. 280/777, 775; 180/78; 74/492, 493; 464/162, 179, 180, 181, 183; 403/2, 265, 266, 267, 377, 378

[56] References Cited

U.S. PATENT DOCUMENTS

| | | | |
|---|---|---|---|
| 3,373,629 | 3/1968 | Wight et al. | 74/492 |
| 3,457,799 | 7/1969 | Lucas et al. | 74/492 |
| 3,473,406 | 10/1969 | Runkle | 74/493 |
| 3,670,591 | 6/1972 | Milton | 74/492 |
| 3,685,369 | 8/1972 | Adams, III | 74/492 |
| 4,337,967 | 7/1982 | Yoshida et al. | 280/777 |
| 4,509,775 | 4/1985 | Arndt | 280/779 |
| 4,833,936 | 5/1989 | Mariani et al. | 74/493 |
| 4,911,034 | 3/1990 | Kulczyk et al. | 74/492 |
| 5,052,848 | 10/1991 | Nakamura | 403/267 |
| 5,086,661 | 2/1992 | Hancock | 74/493 |
| 5,348,345 | 9/1994 | Dykema et al. | 280/777 |
| 5,417,614 | 5/1995 | Dykema et al. | 280/777 |
| 5,477,750 | 12/1995 | Korzan | 280/777 |

*Primary Examiner*—Eric D. Culbreth
*Assistant Examiner*—Peter C. English
*Attorney, Agent, or Firm*—Saul Schwartz

[57] ABSTRACT

An intermediate steering shaft for a motor vehicle steering system including a tabular outer shaft, a tubular center shaft slidably telescoped in the outer shaft, and a solid inner shaft slidably telescoped in the center shaft and all coupled for unitary rotation by respective pairs of flat sides on each. Each of the flat sides of the tubular center shaft is interrupted by a pair of outward facing shallow grooves always concealed in the overlap between the tubular outer and center shafts. One of the flat sides in the tubular center shaft is further interrupted by an exposed shallow groove located near a distal end of the outer shaft in an extended or normal position of the tubular center shaft. A plastic end fitting is in situ injection molded on the tubular outer shaft and includes a pair of thin, flat slide bearings in the concealed shallow grooves, a plurality of shear pins in the inlet and discharge passages, and a collar around the distal end of the outer shaft and an adjacent portion of the center shaft. If the shear pins are fractured inadvertently, a lip of the collar engages an edge of the exposed shallow groove to obstruct telescoping of the tubular center shaft into the tubular outer shaft.

3 Claims, 2 Drawing Sheets

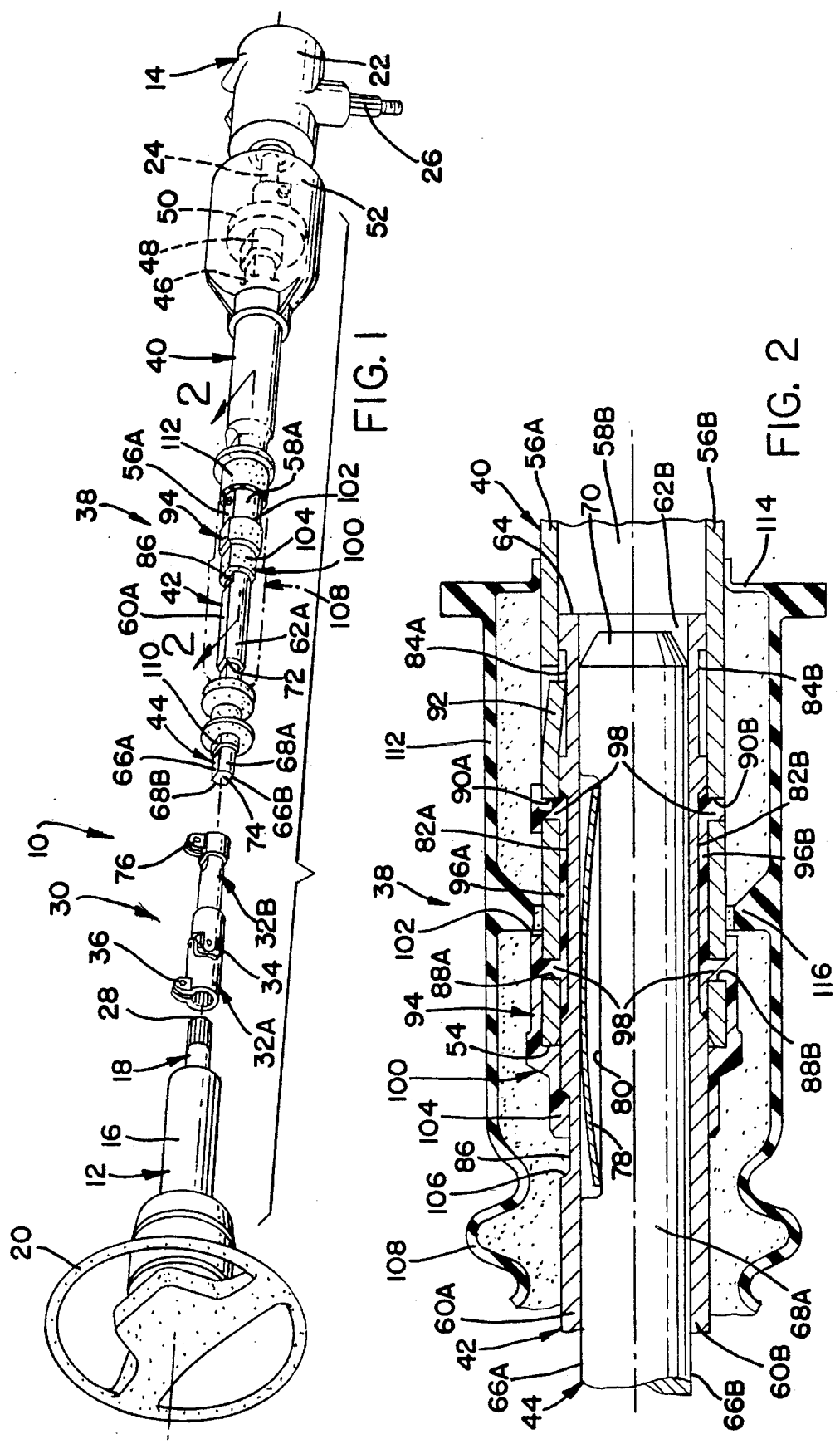

INTERMEDIATE STEERING SHAFT

FIELD OF THE INVENTION

This invention relates to an intermediate steering shaft in a motor vehicle steering system.

BACKGROUND OF THE INVENTION

An intermediate steering shaft commonly consists of a tubular outer shaft and a solid inner shaft slidably telescoped inside the outer shaft and coupled thereto for unitary rotation by flattened sides on each. The telescopic connection between the inner and outer shafts permits foreshortening of the intermediate shaft for assembly between a steering gear and a steering column and accommodates changes in the span between the steering column and steering gear; e.g., from road vibrations, when the vehicle is driven. To eliminate angular lash between the inner and outer shafts attributable to manufacturing tolerance, a cavity is formed in a portion of the solid inner shaft which is always shrouded or overlapped by the tubular outer shaft and a plastic bearing block is injection molded in the cavity through a passage in the outer shaft. Such injection molding of plastic while the two shafts are telescopically engaged is commonly referred to as "in situ" injection molding. In such constructions, the liquid plastic which solidifies or cures in the passage in the tubular outer shaft forms a shear pin integral with the plastic bearing block which maintains the relative longitudinal positions of the inner and outer shafts until fractured by forces urging telescopic collapse of the intermediate steering shaft.

SUMMARY OF THE INVENTION

This invention is a new and improved motor vehicle intermediate steering shaft including a tubular outer shaft, a tubular center shaft slidably telescoped in the outer shaft, and a solid inner shaft slidably telescoped in the center shaft and all coupled for unitary rotation by respective pairs of flat sides on each. Each of the flat sides of the tubular center shaft is interrupted by a pair of outward facing shallow grooves always concealed in the overlap between the tubular outer and center shafts. One of the flat sides in the tubular center shaft is further interrupted by an exposed shallow groove located near a distal end of the outer shaft in an extended or normal position of the tubular center shaft relative to the tubular outer shaft. A plastic end fitting is in situ injection molded on the tubular outer shaft and includes a pair of thin, flat slide bearings in the concealed shallow grooves, a plurality of shear pins in the inlet and discharge passages, and a collar around the distal end of the outer shaft and an adjacent portion of the center shaft. If the shear pins are fractured inadvertently, a lip of the collar engages an edge of the exposed shallow groove to obstruct telescoping of the tubular center shaft into the tubular outer shaft.

BRIEF DESCRIPTION OF THE DRAWINGS

FIG. 1 is a fragmentary, partially broken-away perspective view of a motor vehicle steering system including an intermediate steering shaft according to this invention;

FIG. 2 is an enlarged sectional view taken generally along the plane indicated by lines 2—2 in FIG. 1;

DESCRIPTION OF A PREFERRED EMBODIMENT

Figure 3:
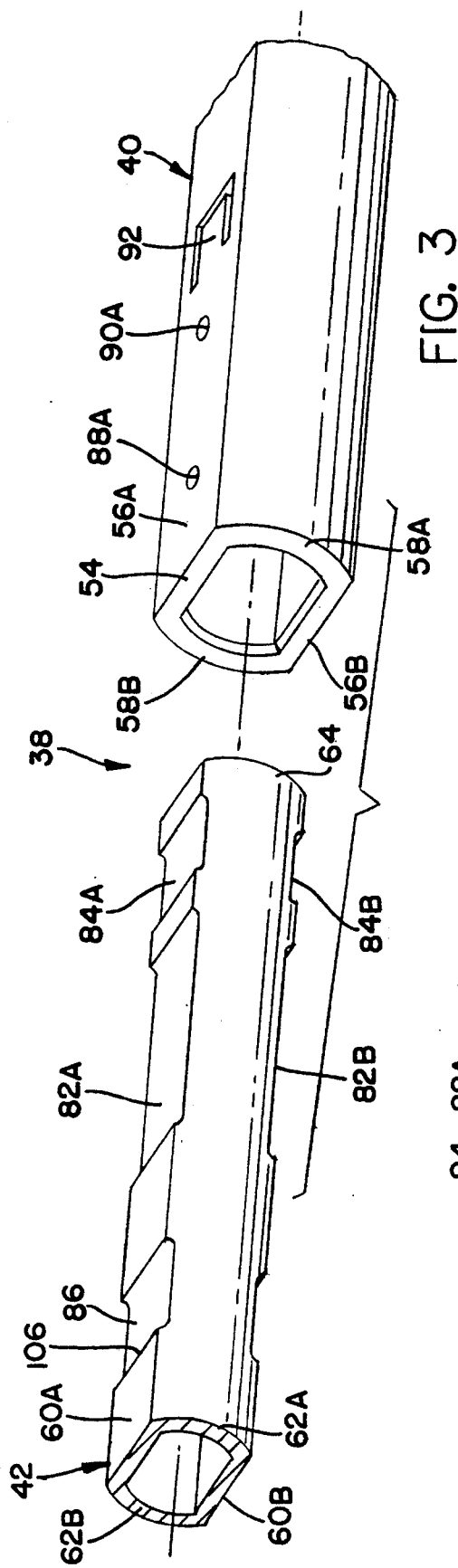
FIG. 3 is a fragmentary, exploded, perspective view of a portion of the intermediate steering shaft according to this invention.

Referring to FIG. 1, a motor vehicle steering system 10 includes a representative steering column 12 and a representative steering gear 14. The steering column 12 includes a tubular mast jacket 16, a steering shaft 18 rotatably supported on the mast jacket, and a steering wheel 20 rigidly attached to an upper end of the steering shaft. The steering gear 14 includes a housing 22, a rotatable input shaft 24, and a rotatable output shaft 26 connected to steered wheels, not shown, of the motor vehicle.

The gap between a lower end 28 of the steering shaft 18 and the steering gear input shaft 24 is partially bridged by a conventional upper intermediate steering shaft 30 including a pair of shaft elements 32A–B interconnected by a simple universal joint 34. A clamp 36 on the shaft element 32A rigidly connects the upper intermediate shaft 30 to the lower end 28 of the steering shaft. The remainder of the gap between the steering shaft 18 and the steering gear input shaft 24 is bridged by a lower intermediate steering shaft 38 according to this invention.

The lower intermediate steering shaft 38 includes a tubular outer shaft 40, a tubular center shaft 42, and a solid inner shaft 44. A first end 46 of the outer shaft is rigidly connected to a boss 48 on one side of a flex coupling 50. The other side of the flex coupling 50 is rigidly connected to the steering gear input shaft 24. A stone guard 52 shrouds the flex coupling. The tubular outer shaft 40 is deformed adjacent a second end 54 thereof to define a pair of diametrically opposite, parallel flat sides 56A–B interconnected by a pair of arc-shaped walls 58A–B, FIG. 3.

The tubular center shaft 42 has a pair of diametrically opposite, parallel flat sides 60A–B extending the full length thereof interconnected by a pair of arc-shaped walls 62A–B the curvature of which matches the curvature of the arc-shaped walls 58A–B of the outer shaft. A first end 64 of the center shaft 42 is slidably telescoped into the second end 54 of the outer shaft 40 with the flat sides 60A–B of the center shaft facing the flat sides of the outer shaft and thereby coupling the outer and center shafts together for unitary rotation. Clearance between the outer and center shafts attributable to manufacturing tolerances permits limited relative rotation; i.e., angular lash, therebetween.

The solid inner shaft 44 has a pair of diametrically opposite, parallel flat side 66A–B extending the full length of the solid shaft and a pair of arc-shaped walls 68A–B the curvature of which matches the curvature of the arc-shaped walls 62A–B of the tubular center shaft. A first end 70 of the solid inner shaft is slidably telescoped into a second end 72, FIG. 1, of the tubular center shaft with the flat sides 66A–B of the inner shaft facing the flat sides 60A–B of the; center shaft and thereby coupling the inner and center shafts together for unitary rotation.

A second end 74 of the solid inner shaft 44 is received in a socket, not shown, in the shaft element 32B of the upper intermediate shaft and rigidly connected to the latter by a clamp 76 to complete the connection between the steering shaft 18 and the steering gear input shaft 24. A leaf spring 78, FIG. 2, in a concealed cavity 80 in the solid inner shaft slidingly bears against the inside of the center shaft 42 to minimize angular lash therebetween attributable to manufacturing tolerances.

Figure 4:
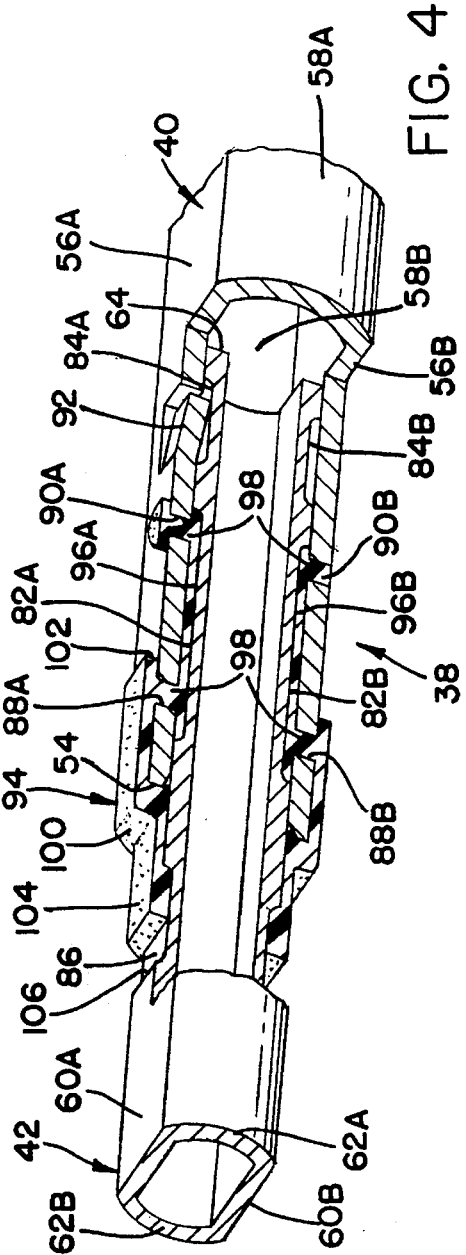
FIG. 4 is a partially broken-away perspective view of a portion of FIG. 2.

As seen best in FIG. 3, the flat sides 60A–B of the tubular center shaft are interrupted by a pair of long shallow grooves 82A–B and by a pair of short shallow grooves 84A–B each of which faces outwardly toward the tubular outer shaft 40 and is concealed or shrouded by the outer shaft in an extended position of the center shaft relative to the outer shaft, FIGS. 1, 2 and 4. The flat side 60A is further interrupted by an additional shallow groove 86 which is exposed beyond the second end 54 of the outer shaft in the extended position of the center shaft. A pair of inlet passages 88A–B and a pair of discharge passages 90A–B in the tubular outer shaft communicate with opposite ends of respective ones of the long shallow grooves 82A–B. A tang 92 in the plane of flat side 56A of the tubular outer shaft overhangs the short shallow groove 84A in the extended position of the tubular center shaft.

The tubular center shaft 42 is releasably retained in its extended position relative to the tubular outer shaft 40 by an in situ injection molded plastic end fitting 94. The plastic end fitting 94 includes a pair of thin slide bearings 96A–B in the long shallow grooves 82A–B, respectively, a plurality of shear pins 98 in the inlet and discharge passages 88A–B, 90A–B, and a collar 100 overlapping the second end 54 of the outer shaft 40 and an adjacent portion the center shaft 42.

The plastic end fitting 94 is formed by mounting the outer and center shafts 40, 42 in a plastic injection molding apparatus, not shown, having a runner encircling the second end 54 of the outer shaft and an adjacent, exposed segment of the center shaft to about the middle of the exposed shallow groove 86. Liquid plastic is introduced into and fills the runner and flows concurrently into the long shallow grooves 82A–B through the inlet passages 88A–B while air is purged through the discharge passages 90A–B. When the long shallow grooves are full, liquid plastic exudes out through the discharge passages 90A–B. An external sensor, not shown, terminates the injection molding cycle when liquid plastic is detected exuding from the discharge passages.

After introduction of liquid plastic terminates, the liquid plastic in the long shallow grooves 82A–B solidifies or cures to form the thin flat plastic slide bearings 96A–B which closely engage the facing flat sides 56A–B of the tubular outer shaft and substantially eliminate angular lash between the tubular center shaft and the tubular outer shaft. In addition, the slide bearings bridge a substantial fraction of the overlap between the outer and center shafts to maximize the rigidity in beam bending of the lower intermediate shaft.

Liquid plastic which concurrently cures in the inlet and discharge passages 88A–B, 90A–B forms the shear pins 98 integral with the slide bearings 96A–B. Until the shear pins 98 are fractured, they retain the tubular center shaft in its extended position relative to the tubular outer shaft. Liquid plastic which cures in the aforesaid runner of the injection molding apparatus forms the collar 100 integral with the shear pins 98 in the inlet passages 88A–B. The collar has a shoulder 102 around the tubular outer shaft and a lip 104 around tubular center shaft. The lip 104 overlaps the exposed shallow groove 86 and faces an edge 106 thereof, FIG. 4.

After completion of the injection molding cycle, the tang 92 on the tubular outer shaft is staked or bent inward into the shallow notch 84A in the tubular center shaft to positively foreclose forced dislodgment of the center shaft from the outer shaft. A corrugated boot 108 conceals the end 72 of the tubular center shaft and the plastic end fitting 94. A first end 110 of the boot grips the solid inner shaft 44 near the second end 74 thereof. A tubular second end 112 of the boot 108, FIG. 2, extends beyond the plastic end fitting 94 and seals against the tubular outer shaft at a lip 114. An inner boss 116 on the tubular second end of the boot interferes with the shoulder 102 of the collar 100 of the plastic end fitting to prevent dislodgment of the boot from the tubular outer shaft.

The lower intermediate steering shaft 38 is usually assembled on a vehicle after the steering column 12, the upper intermediate steering shaft 30, and the steering gear 14. To effect assembly, the solid inner shaft 44 is telescoped into the tubular center shaft 42 to foreshorten the lower intermediate shaft so that it fits between the steering gear and the upper intermediate shaft. Then, the flex coupling 50 is attached to the steering gear input shaft 24 and the solid inner shaft is telescoped out until the second end 74 thereof plugs into and is clamped in the socket in the upper intermediate shaft.

In normal service, the solid inner shaft 44 telescopes in and out of the tubular center shaft 42 to accommodate minor changes in the distance separating the upper intermediate steering shaft 30 and the steering gear input shaft 24 such as may be occasioned by vibrations when the vehicle is driven. If the steering gear 14 is forced rearward toward the steering column 12, the lower intermediate steering shaft 38 foreshortens or collapses in two stages. First, the solid inner shaft 44 telescopes into the tubular center shaft 42 while the shear pins 98 maintain the center shaft in its extended position relative to the tubular outer shaft. When the solid inner shaft is fully telescoped into the tubular center shaft, collapse forces on the center shaft effect fracture of the shear pins 98 and initiate telescopic collapse of the tubular center shaft into the tubular outer shaft 40. Substantially concurrently, the lip 104 on the collar 100 is forced over the edge 106 of the exposed shallow groove 86 and the tang 92 is cammed out of the shallow groove 84A. The effort required to fracture the shear pins 98 and to force the lip 104 over the edge of the exposed shallow groove 86 and the tang 92 out of the shallow groove 84A all contribute to the energy absorbing performance of the steering system and are calculated to exceed forces normally encountered in assembly and use.

The edge 106 of the exposed shallow groove 86 defines a redundant stop which prevents the tubular center shaft from telescoping into the tubular outer shaft if the shear pins 98 are fractured inadvertently. For example, if the lower intermediate shaft is dropped on the floor, the shear pins could be fractured without perceptible telescoping of the center shaft into the outer shaft. In that circumstance, the center shaft is prevented from telescoping any significant distance into the outer shaft by engagement of the lip 104 of the collar on the edge 106 of the exposed shallow groove unless the effort urging such telescopic collapse corresponds to that experienced in the aforesaid circumstance involving rearward displacement of the steering gear 14.

We claim:

1. An intermediate steering shaft comprising:

a tubular first shaft having a first flat side and a distal end, a tubular second shaft having a second flat side projecting into said tubular first shaft through said distal end thereof, said tubular second shaft being slidable telescopically in said tubular first shaft from an extended position and said first flat side cooperating with said second flat side in coupling said tubular first shaft and said tubular second shaft together for unitary rotation, a first shallow groove in said second flat side facing said tubular first shaft and concealed thereby, an inlet passage and a discharge passage in said first flat side communicating with opposite ends of said first shallow groove, a second shallow groove in said second flat side exposed beyond said distal end of said tubular first shaft in said extended position of said tubular second shaft, and an in situ injection molded plastic end fitting on said tubular first shaft including a thin slide bearing in said first shallow groove and a pair of shear pins integral with said slide bearing in said inlet and said discharge passages and a collar integral with said shear pin in said inlet passage, said collar surrounding said distal end of said tubular first shaft and an adjacent portion of said tubular second shaft and including a lip overlapping a portion of said second shallow groove for interference with a side edge thereof to obstruct telescopic collapse of said tubular second shaft into said tubular first shaft when said shear pins are fractured.

2. The intermediate steering shaft recited in claim 1 further comprising:

a third shallow groove in said second flat side concealed by said tubular first shaft in said extended position of said tubular second shaft, and a tang on said first flat side integral with said tubular first shaft bent into said third shallow groove for engagement on a second side edge thereof to prevent dislodgment of said tubular second shaft from said tubular first shaft through said distal end of said tubular first shaft.

3. The intermediate steering shaft recited in claim 2 further comprising:

a shoulder on said collar of said plastic end fitting around said tubular first shaft, an elastomeric boot around said tubular second shaft having a tubular end extending beyond said plastic end fitting, and an internal boss on said tubular end of said boot engageable on said shoulder on said collar of said plastic end fitting for retention of said tubular end of said boot on said tubular first shaft.

* * * * *